July 31, 1934.                E. A. WINFIELD                1,968,473
                         INTERNAL COMBUSTION ENGINE
              Original Filed July 20, 1929      2 Sheets-Sheet 1

Inventor
Edward A. Winfield.

Attorney.

July 31, 1934.  E. A. WINFIELD  1,968,473
INTERNAL COMBUSTION ENGINE
Original Filed July 20, 1929    2 Sheets-Sheet 2
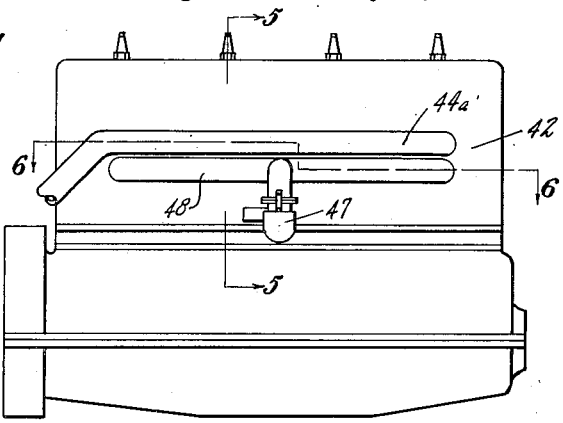
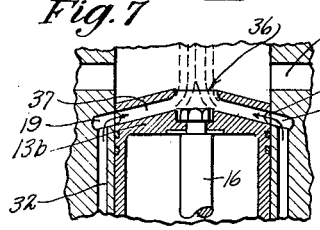
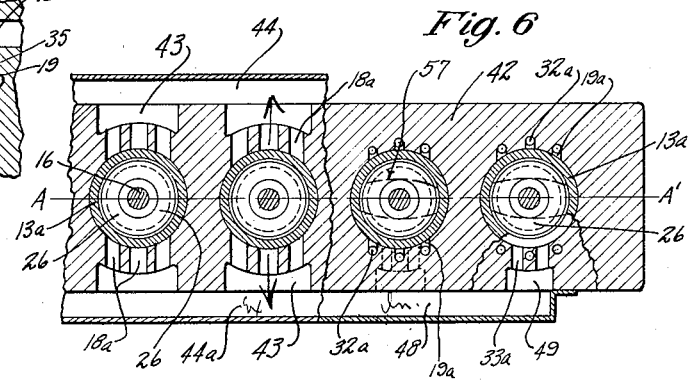
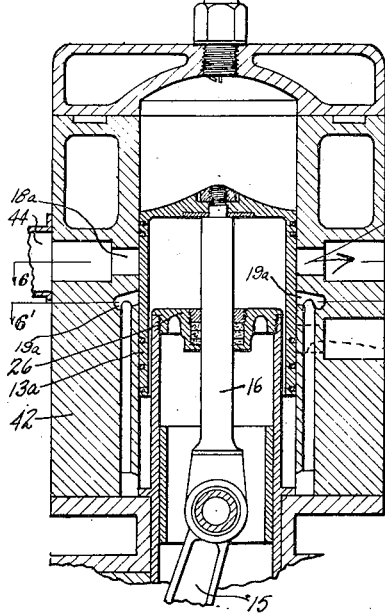
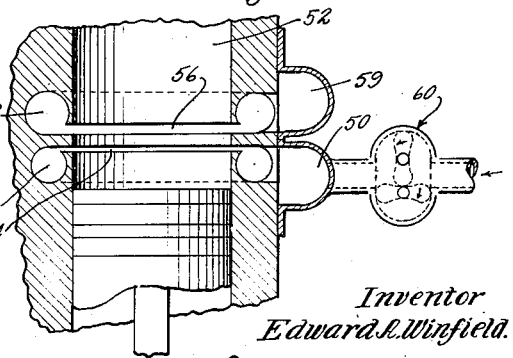
Inventor
Edward A. Winfield.
Attorney.

Patented July 31, 1934

1,968,473

UNITED STATES PATENT OFFICE 1,968,473

INTERNAL COMBUSTION ENGINE

Edward A. Winfield, La Canada, Calif.

Application July 20, 1929, Serial No. 379,781
Renewed September 12, 1933

9 Claims. (Cl. 123—74)

This invention has reference generally to internal combustion engines, and is particularly concerned with a two-cycle type of engine in which the fuel intake and exhaust from the cylinders occurs through ports in the sides of the cylinder, these ports being adapted to be intermittently uncovered by the piston to exhaust the burned gases and to admit a fuel charge to the combustion chamber, and the fuel charge being directed within the cylinder in such a manner as to substantially completely scavenge it of combustion gases. Although two cycle engines heretofore have been designed in which the fuel charge is utilized in scavenging the combustion chamber of burned gases, such engines generally have been unsuccessful, or at least comparatively inefficient, due for the most part to the failure of the charge to remove the exhaust gases with the required thoroughness and the escapement of the charge through the exhaust ports. It is therefore a purpose of my invention to overcome such difficulties by directing the fuel charge within the combustion chamber through a path and at a rate of flow such that the charge effectively displaces the burned gases within the period of exhaust.

In accordance with the invention, exhaust and intake ports are provided around the sides of the combustion chamber, these ports being relatively spaced axially of the chamber and adapted to be successively uncovered by the piston during its firing stroke to preliminarily exhaust the burned gases and to admit a fuel charge to the chamber. Upon uncovering of the exhaust ports a certain amount of the combustion gases is discharged due to the pressure within the cylinder, the initial point of exhaust occurring before the piston reaches the limit of its firing stroke. Immediately after the uncovering of the exhaust ports and the resulting reduction of pressure in the cylinder, the piston uncovers the intake ports to admit a fresh fuel charge. At this point, the fuel charge is directed radially inward to the center of the chamber in a manner whereby it is caused to flow upward therein in a central core and at a fairly high velocity, the charge upon reaching the upper end of the chamber spreading outward and then diffusing downward around its previous upward path of flow to clear the remaining combustion gases from the chamber through the exhaust ports. Preferably the intake ports are arranged so as to be uncovered substantially at the limit of the firing stroke of the piston and therefore are closed prior to the closing of the exhaust ports during the compression stroke of the piston, the relative spacing of the ports being such that sufficient time is permitted for the discharge of the combustion gases before closing of the exhaust ports. It may be mentioned that no back-firing occurs through the intake ports since these preferably are comparatively small and are open only for a short interval of time at the end of the piston firing stroke.

It will be understood that any suitable fuel supply or device for delivering the fuel charge to the cylinder may be used, it being preferred however that the charge be compressed prior to its injection into the cylinder in order to permit rapid injection of fuel as hereinafter described in detail. There is included in the invention a preferred means for compressing the fuel charge prior to its injection into the combustion chamber, a fuel compression chamber being provided in the lower interior of the cylinder and communicable with the combustion chamber by way of the intake ports, and the piston being adapted to compress the fuel charge in the compression chamber and to permit the delivery of the compressed charge to the combustion chamber upon its uncovering the intake ports. Thus it will be noted that the piston may serve the combined functions of compressing the charge in the combustion chamber in the usual manner, controlling the intake and exhaust therein, and compressing the subsequent fuel charge prior to its injection into the combustion chamber.

The above as well as numerous additional features of the invention will be understood most readily and clearly from the following detailed description of preferred and typical embodiments of the invention, reference being had throughout the description to the accompanying drawings, in which:

Fig. 4 is a diagrammatic side elevation of a multi-cylinder engine constructed in accordance with the invention;

Fig. 5 is an enlarged section through one of the engine cylinders taken on line 5—5 of Fig. 4;

Fig. 6 is a horizontal section on broken line 6—6 of Fig. 4, the sections to the left and right of the break being taken respectively on lines 6—6 and 6'—6' of Fig. 5;

Fig. 7 is a fragmentary sectional view illustrating a variational form of piston head; and Fig. 8 is a fragmentary medial section through a cylinder showing variational forms of exhaust and intake ports.

Figure 1:
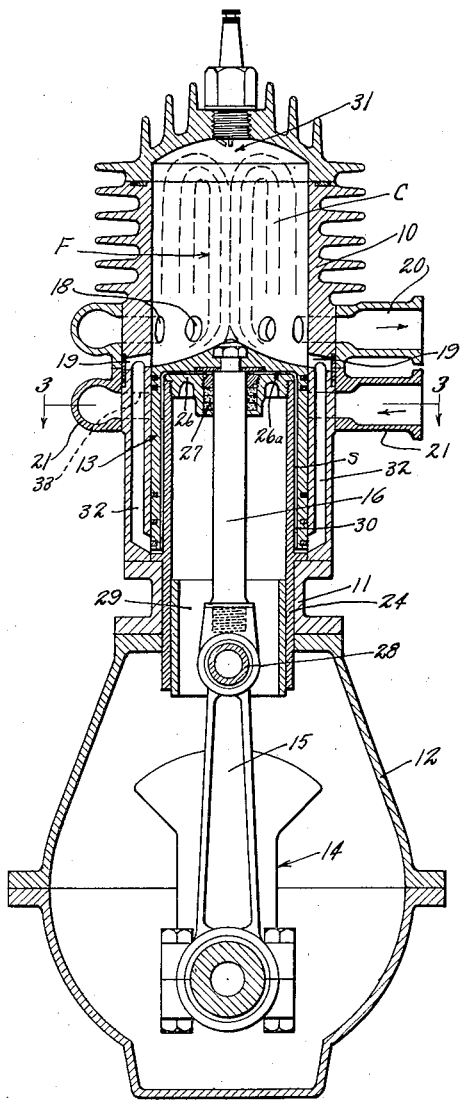
Fig. 1 is a vertical medial section through a single cylinder type of engine embodying the invention, the piston being shown at the end of its firing stroke.
Figure 2:
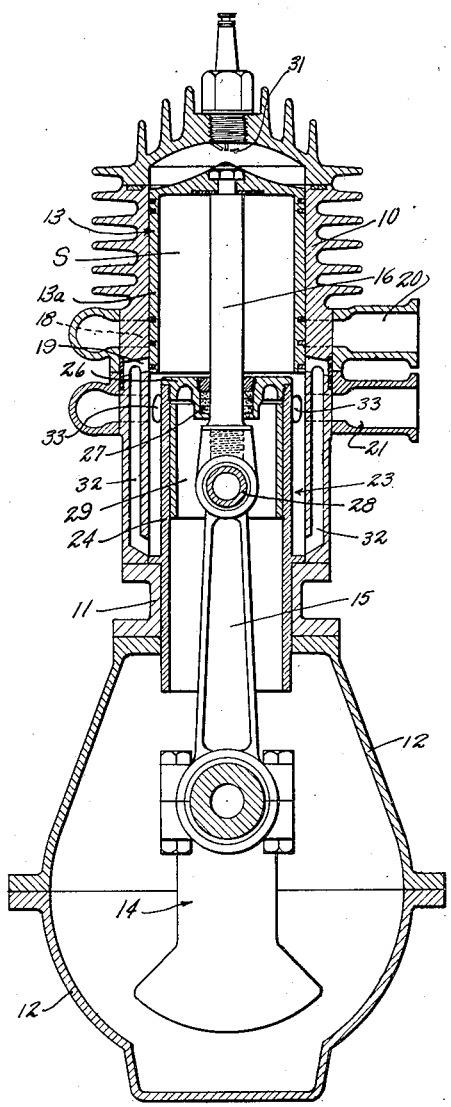
Fig. 2 is similar to Fig. 1, with the piston shown at the limit of its compression stroke.
Figure 3:
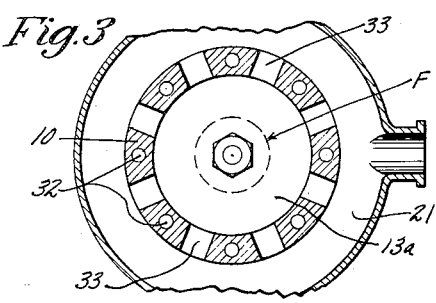
Fig. 3 is a section on line 3—3 of Fig. 1, the piston being shown in plan.

Referring first to Figs. 1 and 2 of the drawings, the cylinder 10 is typically mounted on a flanged collar 11 above the crank case 12, the piston 13 in the cylinder being connected with the crank shaft 14 in the usual manner by means of connecting rod 15 and piston rod 16. A plurality of radial and circumferentially spaced exhaust ports 18 are provided in the cylinder wall at a predetermined vertical point therein, these ports being adapted to be uncovered by the piston toward the end of its firing stroke as indicated in Fig. 1. At a predetermined distance below the exhaust ports is a plurality of circumferentially spaced and preferably comparatively smaller fuel intake or injection ports 19, which are uncovered by the piston at the end of its stroke to permit the fuel charge to be directed radially inward toward the axial center of the combustion chamber C. The intake ports may be inclined as illustrated in order to facilitate the flow of the fuel charge upward within the combustion chamber, although this is not fundamental to the proper directing of the charge since the latter upon being injected to the radial center of the chamber at high velocity, has a tendency to rise and follow a central path within the chamber. The exhaust ports 18 open outwardly into the annular exhaust manifold 20 which, in the form shown in Figs. 1 and 2, extends around the cylinder.

Within the cylinder and annularly spaced at 23 from the inner wall thereof is a tubular element or supporting liner 24 which preferably extends through the flanged collar 11 into the crank case as shown. The upper end of the tubular liner is closed by means of bushing 26, the latter carrying a central packing gland 27 within which the piston rod 16 works. It will be noted that the bushing serves essentially as a lower end wall for the fuel compression chamber S within the piston, hereinafter described, the vertical position of the bushing supporting member 24 preferably being regulated so as to provide a slight clearance as at 26a between the bushing and the piston when the latter is in its lowermost position, although this clearance may be varied if desired. The wrist pin 28 interconnecting the piston rod and the connecting rod 15 terminates in the reciprocating sleeve 29 within the tubular liner 24, the latter serving as a guide for the sleeve. The liner thus serves the combined functions of supporting, from beneath, the bushing 26 to form the lower end wall of the compression chamber, providing a guide for the reciprocating sleeve 29, and also of defining, with the cylinder wall, the annular space 23 within which the lower skirt portion 13a of the piston reciprocates.

The piston 3 is shaped in the form of an inverted cup, the depending skirt portion 13a of the piston being adapted to work within the annular space 23 between the cylinder and the liner 24. A suitable clearance is provided as at 30 between the piston and the liner to permit discharge of the fuel charge from space S within the piston, to the fuel passages 32 during the piston firing stroke, as will later be described. The annular space 23 communicates with an intake manifold 21 similar to the described exhaust manifold, by way of the radial ports 33 extending through the cylinder walls, fuel being drawn from the intake manifold during the compression or upward stroke of the piston into space 23 and the interior chamber S within the piston. Thus it will be noted that during the firing stroke of the piston and after the latter moves downward sufficiently far to cover ports 33, the chamber S and the annular space 23 form a compression chamber for the fuel prior to its delivery to the combustion chamber C. At the point of uncovering the intake ports 19 by the piston substantially at the end of its firing stroke, delivery of the compressed fuel charge within the fuel compression chamber occurs through a plurality of passages 32 formed longitudinally in the cylinder wall and opening at their upper ends into the intake ports.

In describing the operation of the engine, it may be assumed first that the piston is in the position shown in Figure 2 and starting on its firing stroke. The fuel charge previously drawn into chamber S and the annular space 23, during the compression stroke of the piston, is subjected to compression by the piston during its firing stroke after communication with the intake manifold is cut off by the piston covering the intake ports 33. Compression of the fuel charge continues until the piston reaches substantially the limit of its firing stroke, at which point the intake ports 19 are uncovered and the compressed charge beneath the piston is injected into the combustion chamber C by way of passages 32 and the intake ports. It will be understood that the degree to which the fuel charge is compressed may be controlled in numerous ways, for instance by regulating the clearance between the upper end of the liner 24 and the lower end of the piston head, or by regulating the amount of fuel finally remaining in the compression chamber by predetermining the vertical positions of the intake ports 33, thereby fixing the point of cut off by the piston.

At the point of uncovering the exhaust ports 18 by the piston during its firing stroke, a certain amount of the burned gases in chamber C will, by virtue of the pressure therein, be discharged into the exhaust manifold. As previously mentioned, the arrangement of the ports and the path of flow of the fuel charge within the chamber is such that the fuel charge itself serves to complete the scavenging or removal of the remaining exhaust gases. Thus upon uncovering of the intake ports 19, the fuel charge is directed radially inward to the center of the chamber, the charge thence flowing at a fairly high velocity upward and centrally in the form or a cylindrical core as indicated at F in Fig. 1. The charge upon impinging against the upper and preferably curved end of the cylinder, is caused to spread outward and to reverse its path, and to then flow or diffuse downward at reduced velocity toward the exhaust ports to clear the chamber of combustion gases around its initial or central path of flow. Thus the fuel charge serves to displace a portion of the gases of combustion throughout its travel upward through the center of the chamber, and to complete the removal of the gases in sweeping downward about its previously traversed path. It will be seen that due to the charge being directed upward at high velocity against the end of the cylinder, there is assured a fresh and proper fuel mixture at the point of ignition 31 at the plug.

By virtue of there being a plurality of exhaust ports adapted to be simultaneously uncovered by the piston, provision is made for a large exhaust area with a comparatively short length of piston travel, and as a result an immediate preliminary discharge of the combustion gases is effected prior to the uncovering of the intake ports. In order to insure thorough scavenging of the cylinder by the fuel charge, the exhaust ports necessarily remain open a sufficient length of time for the charge to complete its flow through the path described. The time interval however during which the exhaust ports remain open may be controlled by predetermining the vertical spacing of the exhaust and intake ports and by regulating the size of the exhaust ports. It will be apparent that excessive heating of the piston is prevented due to the charge first being conducted beneath the piston and thereafter caused to sweep across its upper end during the period of intake to the combustion chamber.

As previously mentioned, the intake ports may be inclined as illustrated in order to direct the fuel charge so as to flow axially through the chamber as well as radially inward to the center thereof. Additional directing means may be provided for conducting the charge substantially to the center of the combustion chamber and thereafter releasing it to flow upward in a central core to the top of the chamber. Referring particularly to Fig. 7, an annular recess 35 is formed in the piston head 13b, this recess communicating with a central recess 36 in the upper end of the piston by way of a plurality of radially extending passages 37. At the end of the piston stroke, the annular recess 35 registers with the intake ports 19, the fuel charge thus being conducted through passages 37 and thence directed upwardly within the combustion chamber from the center of the piston.

In Figs. 4 to 6 the invention is illustrated as applied typically to a four cylinder engine. Referring particularly to Figs. 5 and 6, the port and fuel passage arrangement as well as the piston and fuel compression chamber assembly is generally similar to that described hereinabove in the single cylinder type of engine, except that the exhaust and intake ports 18a and 19a instead of being arranged about the entire periphery of the combustion chamber, are formed only in opposite sides thereof, and the fuel inlet ports 33a for the compression chamber are provided only at one side. As clearly shown in Fig. 6, the exhaust ports 18a are arranged on opposite sides of the cylinders and may extend at right angles at the longitudinal axis A—A' of the engine block 42, the combustion gases being conducted through the recessed passages 43 into the exhaust manifold 44 and 44a on opposite sides of the block. The comparatively smaller intake ports 19a are similarly arranged at opposite sides of the cylinders below the exhaust ports, the fuel being delivered to these ports from the compression chamber as in the previous instance by way of passage 32a. The intake manifold 48 into which the fuel is drawn from the carburetor 47 extends only on one side of the cylinders, fuel being taken into the compression chamber through passages 49 and the inlet ports 33a.

By arranging the ports only on opposite sides instead of entirely around the cylinders, the fuel charge is directed in a manner whereby it serves to scavenge the combustion chamber of exhaust gases as in the previous instance, although the section of the path followed by the fuel charge during its upward flow within the cylinder is varied somewhat in accordance with the rearrangement of the intake ports. Thus with the ports arranged as indicated in Fig. 6, the fuel charge during its upward flow within the combustion chamber takes the form of a somewhat rectangular or flattened core, the cross section of which is diagrammatically represented at 57. Although in this case the charge flows upward in a path of comparatively flattened section, instead of cylindrical as when the ports are arranged entirely around the cylinder, the action had by the charge in displacing the burned gases from a combustion chamber is essentially the same.

In Fig. 8 I have shown a variational form of port arrangement generally similar in effect to that described in Fig. 1 but in which the intake and exhaust ports open continuously around the inner periphery of the combustion chamber. In this embodiment, the fuel is delivered through the intake manifold 50 to an annular passage 53 surrounding the combustion chamber 52, the charge being injected into the cylinder from passage 53 through the annular and comparatively restricted slot 54. A similar annular exhaust port is provided above the intake port, the combustion gases being discharged through the comparatively wider annular slot 56 into passage 58 and thence into the exhaust manifold 59. It will be understood that this arrangement of ports may be embodied in either of the designs described hereinabove, but as an additional modification, it may be mentioned that instead of compressing the charge prior to its injection into the combustion chamber by means of the piston, a suitable compressor or blower, typically indicated at 60 may be provided within the intake manifold to inject fuel from the carburetor into the cylinder at the desired pressure and velocity.

It will be understood the drawings and description are to be considered merely as illustrative of and not restrictive on the broader claims appended hereto, for various changes in design, structure and arrangement may be made without departing from the spirit and scope of said claims.

I claim:

1. In an internal combustion engine, a cylinder having a stationary wall forming a combustion chamber and a piston in said chamber, intake ports in the stationary wall of the cylinder and surrounding said chamber, exhaust ports in the wall of the cylinder above said intake ports and surrounding said chamber, the intake and exhaust of fuel and burned gases through said ports being controlled by the covering and uncovering of the ports by the piston, means forming a compression chamber of substantially smaller volume than the displacement volume of said cylinder, said compression chamber being communicable with said intake ports, and a plurality of discharge ports arranged in the wall of said cylinder in substantially surrounding positions about said combustion chamber and communicable therewith, said discharge ports being located below said exhaust ports and above the inlet ports, the last mentioned ports being adapted to be covered and uncovered by the piston, and fuel being discharged at high velocity through said discharge ports when uncovered by the piston, inwardly toward the center of said combustion chamber.

2. In an internal combustion engine, a cylinder having a stationary wall forming a combustion chamber and a piston in said chamber, air intake manifold and intake ports in the stationary wall of the cylinder at opposite sides of the chamber and leading from said intake manifold, exhaust ports in the wall of the cylinder at opposite sides of said chamber and directly above said intake ports, the intake and exhaust of fuel and burned gases through said ports being controlled by the covering and uncovering of the ports by the piston, and means for compressing a fuel charge and for delivering the compressed charge under control of the piston to said combustion chamber at a point below said exhaust ports and above the intake ports.

3. In an internal combustion engine, a cylinder having a stationary wall forming a combustion chamber and a piston in said chamber, there being a fuel compression chamber in the lower interior of said cylinder and the piston serving to compress fuel charges in both of said chambers, intake ports in the stationary wall of the cylinder and surrounding said combustion chamber, exhaust ports in the wall of the cylinder above said intake ports and surrounding the combustion chamber, the intake and exhaust of fuel and burned gases through said ports being controlled by the covering and uncovering of the ports by the piston, and a passage leading from said compression chamber to the combustion chamber through a circular arrangement of parts located in the cylinder wall below said exhaust ports and above the intake ports.

4. In an internal combustion engine, a cylinder having a stationary wall forming a combustion chamber and a piston in said chamber, there being a fuel compression chamber in the lower interior of said cylinder and the piston serving to compress fuel charges in both of said chambers, intake ports in the stationary wall of the cylinder at opposite sides of the combustion chamber, exhaust ports in the wall of the cylinder at opposite sides of the combustion chamber and directly above said intake ports, the intake and exhaust of fuel and burned gases through said ports being controlled by the covering and uncovering of the ports by the piston, and a plurality of circularly arranged passages leading from said compression chamber to the combustion chamber through a circular arrangement of ports located in the cylinder wall below said exhaust ports and above the intake ports.

5. In an internal combustion engine, a cylinder having a stationary wall forming a combustion chamber and a piston in said chamber, an intake manifold and an intake port in said cylinder wall communicating with the intake manifold, an exhaust port in the cylinder wall above said intake port, the intake and exhaust of fuel and burned gases through said ports being controlled by the covering and uncovering of said ports by the piston, injection ports in opposite sides of the cylinder wall leading into said combustion chamber at points below said exhaust port and above the intake port, and means for compressing a fuel charge and for discharging the compressed charge through said injection ports into the combustion chamber under control of the piston.

6. In an internal combustion engine, a cylinder having a stationary wall forming a combustion chamber and a piston in said chamber, an intake manifold and an intake port in said cylinder wall communicating with the intake manifold, an exhaust port in the cylinder wall above said intake port, the intake and exhaust of fuel and burned gases through said ports being controlled by the covering and uncovering of said ports by the piston, injection ports at circularly spaced intervals in the cylinder wall and surrounding and leading into said combustion chamber at points below said exhaust port and above the intake port, and means for compressing a fuel charge and for discharging the compressed charge through said injection ports into the combustion chamber under control of the piston.

7. In an internal combustion engine, a cylinder having a stationary wall forming a combustion chamber and a piston in said chamber, an intake manifold and an intake port in said cylinder wall communicating with the intake manifold, exhaust ports in opposite sides of the cylinder wall above said intake port, the intake and exhaust of fuel and burned gases through said ports being controlled by the covering and uncovering of said ports by the piston, injection ports in opposite sides of the cylinder wall leading into said combustion chamber at points below said exhaust ports and above the intake port, and means for compressing a fuel charge and for discharging the compressed charge through said injection ports into the combustion chamber under control of the piston.

8. In an internal combustion engine, a cylinder and an inverted cup-shaped piston in said chamber, the upper interior of the cylinder forming a combustion chamber, a tubular member in the lower interior of the cylinder and annularly spaced from the wall thereof, the upper end of said member being closed and the piston rod extending therethrough, said annular space and the piston interior forming a fuel compression chamber, an exhaust port in the wall of said combustion chamber, an intake port in the cylinder wall below said exhaust port and leading into said compression chamber, said exhaust port being adapted to be uncovered by the piston to exhaust the burned gases, and said intake port being uncovered by the piston toward the end of its opposite stroke to admit a fuel charge to said compression chamber, a plurality of fuel passages extending longitudinally in the cylinder wall and communicating with the compression chamber, and a plurality of injection ports in opposite sides of the cylinder below said exhaust port and above the intake port, said injection ports leading from said passages to the combustion chamber and being adapted to be covered and uncovered by the piston.

9. In an internal combustion engine, a piston cylinder and an inverted cup-shaped piston in said chamber, a combustion chamber in the upper interior of the cylinder, a tubular liner in the lower interior of the cylinder and annularly spaced therefrom, the upper end of said liner being closed and the piston rod extending axially therethrough, and said annular space and the piston interior forming a fuel compression chamber, a plurality of circumferentially spaced exhaust ports in the stationary wall of said combustion chamber and circumferentially spaced intake ports directly below said exhaust ports and leading into said compression chamber, said exhaust ports being uncovered by the piston toward the end of its firing stroke to exhaust the burned gases, and said intake ports being uncovered by the piston toward the end of its opposite stroke to admit a fuel charge to said compression chamber, a plurality of fuel passages in the cylinder wall and communicating with the compression chamber, and a plurality of injection ports in the wall of the cylinder below said exhaust ports and above said intake ports, said injection ports being adapted to be covered and uncovered by the piston and leading from said fuel passages to the combustion chamber.

EDWARD A. WINFIELD.

CERTIFICATE OF CORRECTION.

Patent No. 1,968,473.  July 31, 1934.

EDWARD A. WINFIELD.

It is hereby certified that error appears in the printed specification of the above numbered patent requiring correction as follows: Page 4, line 20, claim 3, for "parts" read ports; and that the said Letters Patent should be read with this correction therein that the same may conform to the record of the case in the Patent Office.

Signed and sealed this 25th day of September, A. D. 1934.

Leslie Frazer

Acting Commissioner of Patents, (Seal)